US012267661B2

(12) United States Patent
Yang et al.

(10) Patent No.: US 12,267,661 B2
(45) Date of Patent: Apr. 1, 2025

(54) SPEAKER MODULE AND ASSEMBLING METHOD THEREOF

(71) Applicants: AAC ACOUSTIC TECHNOLOGIES (SHENZHEN) CO., LTD., Shenzhen (CN); AAC Microtech (Changzhou) Co., Ltd., Changzhou (CN)

(72) Inventors: Haijuan Yang, Shenzhen (CN); Lei Wang, Shenzhen (CN); Shuwen Wu, Shenzhen (CN)

(73) Assignees: AAC ACOUSTIC TECHNOLOGIES (SHENZHEN) CO., LTD., Shenzhen (CN); AAC Microtech (Changzhou) Co., Ltd., Changzhou (CN)

( * ) Notice: Subject to any disclaimer, the term of this patent is extended or adjusted under 35 U.S.C. 154(b) by 0 days.

(21) Appl. No.: 17/918,900

(22) PCT Filed: Jun. 10, 2022

(86) PCT No.: PCT/CN2022/098084
§ 371 (c)(1),
(2) Date: Oct. 13, 2022

(87) PCT Pub. No.: WO2023/226093
PCT Pub. Date: Nov. 30, 2023

(65) Prior Publication Data
US 2025/0080917 A1 Mar. 6, 2025

(30) Foreign Application Priority Data
May 24, 2022 (CN) ......................... 202210568977.8

(51) Int. Cl.
*H04R 9/06* (2006.01)
*H04R 7/04* (2006.01)
(Continued)

(52) U.S. Cl.
CPC ................ *H04R 9/06* (2013.01); *H04R 7/04* (2013.01); *H04R 9/025* (2013.01); *H04R 31/00* (2013.01)

(58) Field of Classification Search
CPC . H04R 9/06; H04R 7/04; H04R 9/025; H04R 31/00; H04R 9/046; H04R 1/021; H04R 1/44
See application file for complete search history.

(56) References Cited

U.S. PATENT DOCUMENTS 11,277,693 B1* 3/2022 He ......................... H04R 1/025
2018/0035198 A1* 2/2018 Zhong .................... H04R 9/025

FOREIGN PATENT DOCUMENTS

CN 210641058 U * 5/2020 ............... H04R 1/44
KR 101811733 B1 * 12/2017 ............. H04R 9/046
WO WO-2021218554 A1 * 11/2021 ............. H04R 1/021

* cited by examiner

*Primary Examiner* — Angelica M McKinney
(74) *Attorney, Agent, or Firm* — W&G Law Group

(57) ABSTRACT

A speaker module includes a housing, a vibration system, and a magnetic circuit system. An accommodation space is defined in the housing, the vibration system is accommodated in the accommodation space, and the magnetic circuit system is accommodated in the accommodation space and is configured to drive the vibration system. The housing includes a supporting frame, a front cover, and a rear cover. The vibration system and the magnetic circuit system are directly assembled with the housing to obtain the loudspeaker module. Compared with the related art, an assembling process of the speaker module is simplified from two separate assembly processes of a speaker and a module into single assemble process of the speaker, which provides a simple assembling process and further reduces the cost.

10 Claims, 8 Drawing Sheets

(51) Int. Cl.

| | |
|---|---|
| ***H04R 9/02*** | (2006.01) |
| ***H04R 31/00*** | (2006.01) |

SPEAKER MODULE AND ASSEMBLING METHOD THEREOF

TECHNICAL FIELD

The present disclosure relates to the field of electroacoustic technology, and in particular to a speaker module and an assembling method thereof.

BACKGROUND

As a sound producing device for electronic products, such as mobile phones, televisions, and computers, speakers are widely used in daily production and life of people. With the increase of requirements of people on acoustic performance of the speakers, there are also higher requirements for an assembling method of loudspeaker modules.

The loudspeaker modules in the related art generally include a speaker monomer, a front housing, a rear housing, a three-dimensional mesh, a flexible printed circuit (FPC), a mesh, etc. In an assembling process of the loudspeaker modules, the loudspeaker monomer is first assembled, and then the loudspeaker monomer is assembled with other component, so that the assembling process of the loudspeaker modules is complex, and a cost of which is high. Meanwhile, leakproofness of the speaker modules is also easily reduced.

Therefore, it is necessary to provide a speaker module and an assembling method thereof to solve above technical problems.

SUMMARY

The present disclosure aims to provide a speaker module and assembling method thereof to solve problems in the related art that an assembling process of the loudspeaker module is complex, and a cost of which is high.

Technical solutions of a first aspect of the present disclosure are as following.

The present disclosure provides a speaker module, including a housing, a vibration system, and a magnetic circuit system. An accommodation space is defined in the housing, the vibration system is accommodated in the accommodation space, and the magnetic circuit system is accommodated in the accommodation space and is configured to drive the vibration system. The housing includes a supporting frame, a front cover, and a rear cover. A through cavity is defined in the supporting frame, the front cover covers a first side of the supporting frame, and the rear cover covers a second side of the supporting frame, where the second side of the supporting frame faces away from the front cover. A positioning structure is disposed on an inner side of the supporting frame, the inner side of the supporting frame extends into the through cavity to form clamping plates, an edge of the vibration system is connected to a first side, close to the front cover, of the positioning structure, and the magnetic circuit system is fixed to a second side, close to the rear cover, of the positioning structure and further fixed to the clamping plates. The vibration system and the front cover enclose to form a front cavity, and the vibration system, the supporting frame, and the rear cover enclose to form a rear cavity.

Furthermore, the supporting frame includes a main frame and an enclosing frame, the through cavity is defined on the main frame, and the enclosing frame is fixedly connected to one side, distal from the front cover, of the main frame. The positioning structure is disposed on the main frame. A first side, connected to the main frame, of the enclosing frame extends into the through cavity to form the clamping plates. The main frame, the enclosing frame, and the clamping plates are integrally disposed, and the rear cover covers a second side, faces away from the main frame, of the enclosing frame.

Furthermore, the main frame is made of a plastic material. The first side, connected the main frame, of the enclosing frame is bent towards one side to form a connecting edge, and the connecting edge is embedded and connected in the main frame.

Furthermore, the positioning structure includes a positioning portion, and the positioning portion extends from the inner side of the supporting frame into the accommodation space. The vibration system includes a voice coil assembly and a vibrating diaphragm assembly, the voice coil assembly is elastically connected to the positioning portion, and the vibrating diaphragm assembly is elastically connected to the supporting frame and further connected with the voice coil assembly. The voice coil assembly and the vibrating diaphragm assembly are all disposed on one side, close to the front cover, of the positioning portion, and the vibrating diaphragm assembly seals one side, close to the front cover, of the supporting frame.

Furthermore, the voice coil assembly includes an elastic connecting member, a voice coil, and a flexible circuit board. One end of the elastic connecting member is connected to the positioning portion, the voice coil is connected to one side, distal from the positioning portion, of the elastic connecting member, two ends of the flexible circuit board are respectively and fixedly connected to the positioning portion and the voice coil. One side, close to the front cover, of the voice coil is connected to the vibrating diaphragm assembly.

Furthermore, the vibrating diaphragm includes a dome and a vibrating diaphragm. The dome is connected to the voice coil, the vibrating diaphragm is fixed on the dome and regards the dome as a center to diverge outwards to connect to the supporting frame. The vibrating diaphragm and the dome together seal the one side, close to the front cover, of the supporting frame.

Furthermore, the magnetic circuit system includes a magnetic bowl, a first magnetic steel, and a second magnetic steel. The magnetic bowl is fixed to one side, close to the rear cover, of the positioning portion, the first magnetic steel is fixed to the magnetic bowl and accommodated in the voice coil, the second magnetic steel is fixed to the magnetic bowl and are spaced apart from the first magnetic steel. One side, distal from the magnetic bowl, of the second magnetic steel is fixed to the clamping plates, and the voice coil is disposed between the first magnetic steel and the second magnetic steel.

Furthermore, a ventilation hole is defined on the magnetic bowl. The magnetic circuit system further includes a ventilation spacer, the ventilation spacer is fixed on the magnetic bowl and covers the ventilation hole. The magnetic bowl, the ventilation spacer, the supporting frame, and the rear cover enclose to form a filing cavity.

Furthermore, a filing hole is defined on the rear cover, and the filing hole is communicated with the filing cavity. An area, with respect to the voice coil assembly, of the front cover protrudes towards a direction distal from the voice coil assembly. At least one sound hole is defined on the area, with respect to the voice coil assembly, of the front cover, a mesh cloth is fixed on one side, distal from the voice coil assembly, of the front cover, and the mesh cloth covers the at least one sound hole.

Technical solutions of a second aspect of the present disclosure are as following.

The present disclosure further provides an assembling method of the speaker module mentioned above, including following steps:

arranging a supporting frame having a through cavity, where a positioning structure is disposed on an inner side of the supporting frame and the inner side of the supporting frame extends into the through cavity to form clamping plates;

connecting an edge of a vibration system to the positioning structure, fixing a magnetic circuit system to one side, distal from the vibration system, of the positioning structure, and further fixing the magnetic circuit system to the clamping plates to arrange the vibration system and the magnetic circuit system in the supporting frame; and covering a front cover on a first side, close to the vibration system, of the supporting frame, covering a rear cover on a second side, close to the magnetic circuit system, of the supporting frame to enclose the vibration system and the front cover to form a front cavity, to enclose the vibration system, the supporting frame, and the rear cover to form a rear cavity, and to together form a housing through the front cover, the supporting frame, and the rear cover.

Beneficial effects of the present disclosure are as following.

The vibration system and the magnetic circuit system are assembled in the accommodation space of the housing through the positioning structure to directly assemble the vibration system and the magnetic circuit system with the housing to obtain the loudspeaker module. Compared with the related art, an assembling process of the speaker module of the present disclosure is simplified from two separate assembly processes of a speaker and a module into single assemble process of the speaker, which provides a simple assembling process and further reduces the cost. Meanwhile, the vibration system, the supporting frame, and the rear cover enclose to form the rear cavity having better leakproofness, which is beneficial for reducing a risk of air leakage.

DETAILED DESCRIPTION OF EMBODIMENTS

Figure 1:
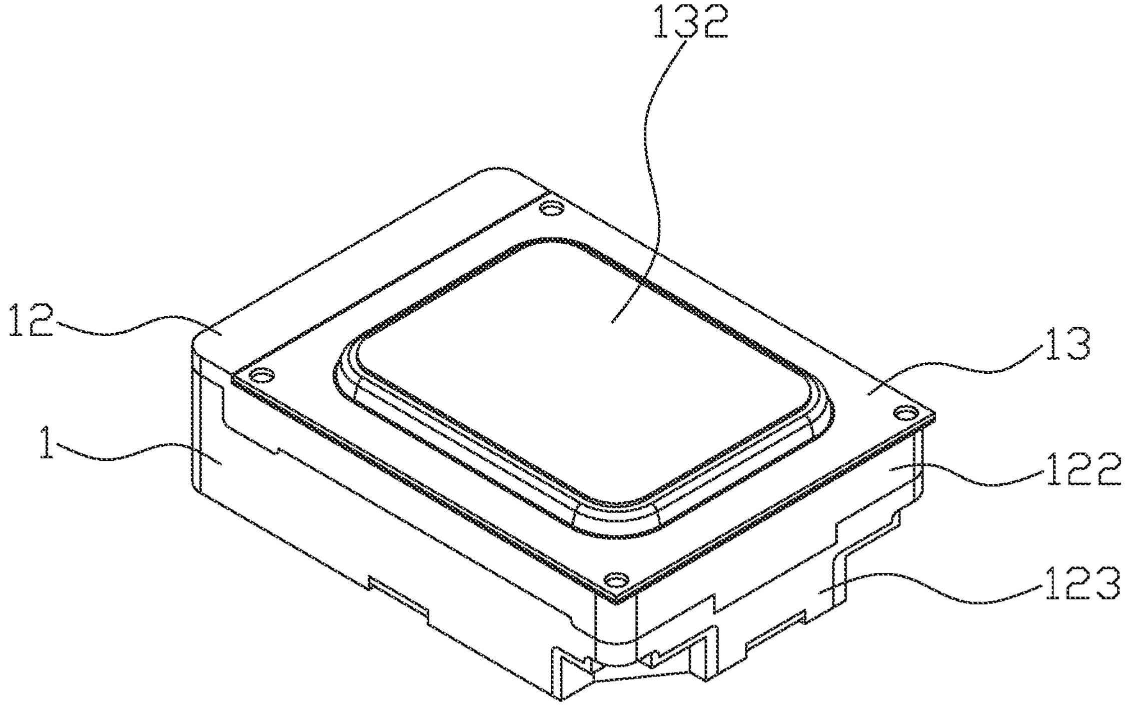
FIG. 1 is an overall structural schematic diagram of a speaker module according to a first embodiment of the present disclosure.

The present disclosure is further described below with reference to the accompanying drawings and embodiments.

First Embodiment

As shown in FIGS. 1-7, the first embodiment of the present disclosure provides a speaker module, including a housing 1, a vibration system 2, and a magnetic circuit system 3. An accommodation space 11 is defined in the housing 1, the vibration system 2 is accommodated in the accommodation space 11, and the magnetic circuit system 3 is accommodated in the accommodation space 11 and is configured to drive the vibration system 2. The housing 1 includes a supporting frame 12, a front cover 13, and a rear cover 14. A through cavity is defined in the supporting frame 12, the front cover 13 covers a first side of the supporting frame 12, and the rear cover 14 covers a second side of the supporting frame 12, where the second side of the supporting frame 12 faces away from the front cover 13. A positioning structure 15 is disposed on an inner side of the supporting frame 12, the inner side of the supporting frame 12 extends into the through cavity to form clamping plates 121, an edge of the vibration system 2 is connected to a first side, close to the front cover 13, of the positioning structure 15, and the magnetic circuit system 3 is fixed to a second side, close to the rear cover 14, of the positioning structure 15 and further fixed to the clamping plates 121. The vibration system 2 and the front cover 13 enclose to form a front cavity 4, and the vibration system 2, the supporting frame 12, and the rear cover 14 enclose to form a rear cavity 5.

The vibration system 2 and the magnetic circuit system 3 are assembled in the accommodation space 11 of the housing 1 through the positioning structure 15 to directly assemble the vibration system 2 and the magnetic circuit system 3 with the housing 1 to obtain the loudspeaker module. Compared with the related art, an assembling process of the speaker module of the present disclosure is simplified from two separate assembly processes of a speaker and a module into single assemble process of the speaker, which provides a simple assembling process and further reduces a cost. Meanwhile, the vibration system 2, the supporting frame 12, and the rear cover 14 enclose to form the rear cavity 5 having better leakproofness, which is beneficial for reducing a risk of air leakage.

As shown in FIGS. 2-5, in the embodiment, the supporting frame 12 includes a main frame 122 and an enclosing frame 123, the through cavity is defined on the main frame 122, and the enclosing frame 123 is fixedly connected to one side, distal from the front cover 13, of the main frame 122. The positioning structure 15 is disposed on the main frame 122. A first side, connected to the main frame 122, of the enclosing frame 123 extends into the through cavity to form the clamping plates 121. The main frame 122, the enclosing frame 123, and the clamping plates 121 are integrally disposed, and the rear cover 14 covers a second side, faces away from the main frame 122, of the enclosing frame 123. Specifically, both the main frame 122 and the enclosing frame 123 may be rectangular frames, the rear cover 14 and the front cover 13 are rectangular plates. The vibration system 2 is connected to the main frame 122 through the positioning structure 15, the magnetic circuit system 3 is fixed with the main frame 122 through the positioning structure 15 and is fixed with the enclosing frame 123 through the clamping plates 131, so that the vibration system 2 and the magnetic circuit system 3 are achieved to directly assembled with the housing 1 to obtain the speaker module. The main frame 122, the enclosing frame 123, and the clamping plates 121 are integrally disposed to fix a connection between the clamping plates 131 and the enclosing frame 123 and a connection between the enclosing frame 123 and the main frame 122, which has a low risk of reliability. Meanwhile, compared with a front housing and a rear housing in the related art, a forming difficulty of the housing 1 is greatly reduced. Furthermore, a plurality of positioning grooves is defined on sides, connected to the rear cover 14, of the enclosing frame 123, and a plurality of positioning blocks, matched with the plurality of the positioning grooves, extends outwards from edges of the rear cover 14. For example, each one of the plurality of the positioning blocks is disposed on a respective one of the edges of the rear cover 14, each one of the plurality of the positioning grooves is defined on a respective one of the sides, connected to the rear cover 14, of the enclosing frame 123. After the plurality of the positioning blocks is assembled with the plurality of the positioning grooves, the rear cover 14 may be accurately placed in a respective position of the enclosing frame 123, which is beneficial for enclosing the vibration system 2, the supporting frame 12, and the rear cover 14 to form the rear cavity 5 being sealed.

Figure 2:
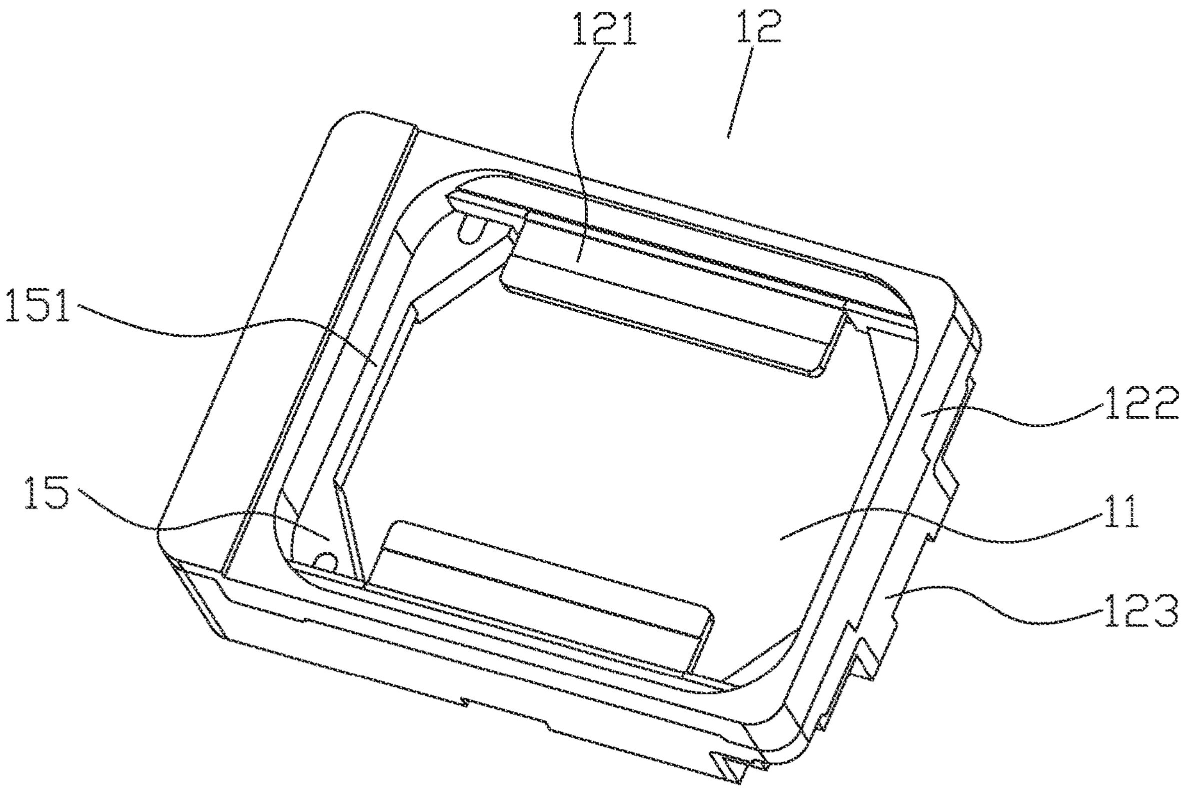
FIG. 2 is a structural schematic diagram of a supporting frame of the speaker module according to the first embodiment of the present disclosure.
Figure 3:
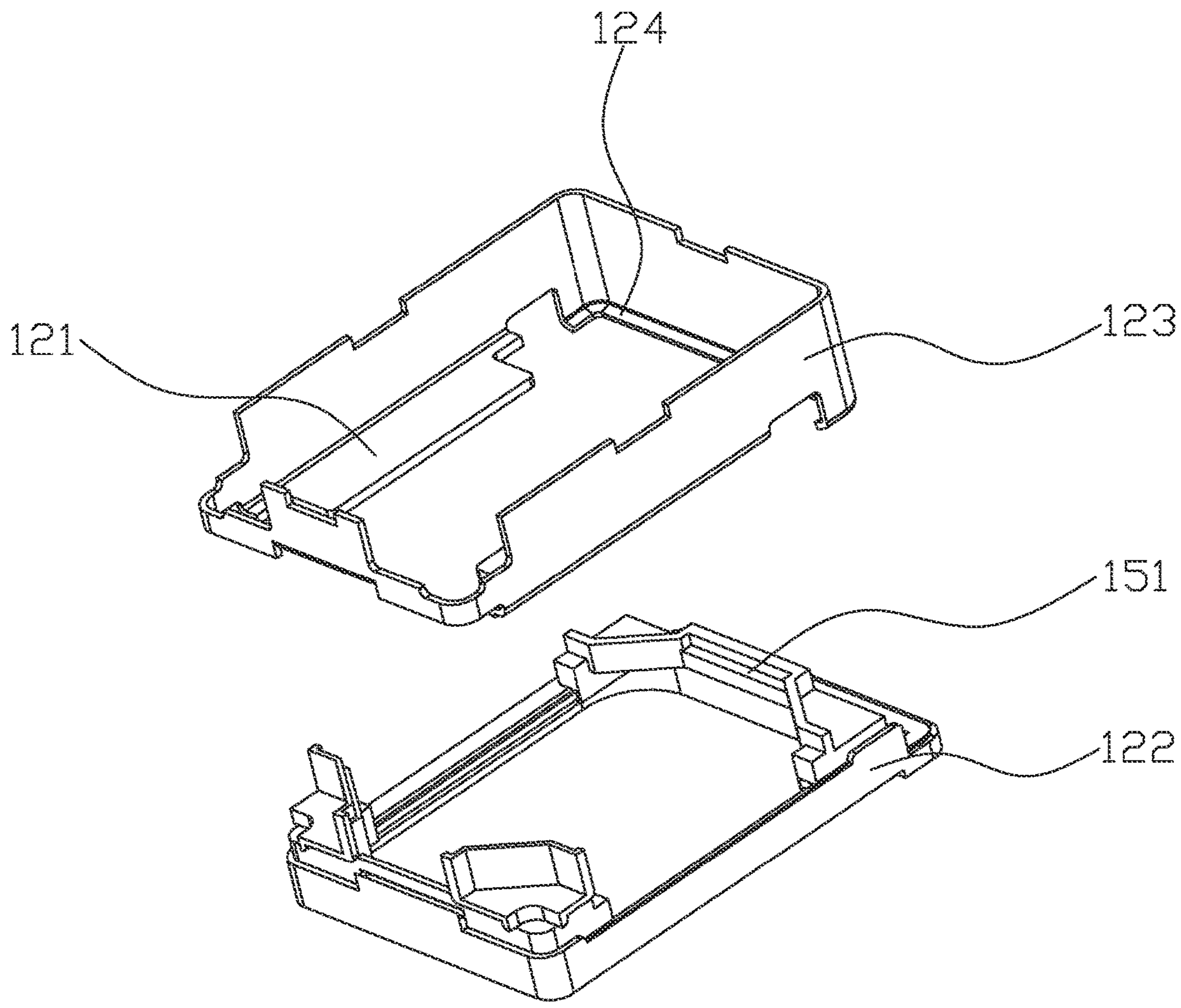
FIG. 3 is an exploded schematic diagram of the supporting frame of the speaker module according to the first embodiment of the present disclosure.

Furthermore, as shown in FIGS. 2-3, the main frame 122 is made of a plastic material. The first side, connected the main frame 122, of the enclosing frame 123 is bent towards one side to form a connecting edge 124, and the connecting edge 124 is embedded and connected in the main frame 122. Specifically, the main frame 122 may be made of a plastic, the enclosing frame 123 may be made of metal materials, injection molding may be used between the main frame 122 and the enclosing frame 123, which is convenient for achieving that the main frame 122, the enclosing frame 123, and the clamping plates 121 are integrally disposed. The connecting edge 124 may be a connecting block, during a process of the injection molding between the main frame 122 and the enclosing frame 123, the connecting edge 124 is embedded in the main frame 122, so that a connection between the main frame 122 and the enclosing frame 123 is more compact. Meanwhile, it is beneficial for tightly matching side walls of the enclosing frame 123 with the main frame 122, and the leakproofness of the rear cavity 5 is further improved. Moreover, the enclosing frame 123 is made of the metal materials, and the clamping plates 121 extend into the accommodation space 11, so that heat generated by the speaker module during working is conducted to an outside through the clamping plates 121 and the enclosing frame 123 to improve working stability of the speaker module. Furthermore, a reinforcing rib frame is further fixed in the main frame 122, so that a concave cavity is formed at a corner of the main frame 122, a respective corner of the enclosing frame 123 is embedded in the concave cavity, and connection compactness between the main frame 122 and the enclosing frame 123 is further enhanced.

As shown in FIGS. 4-7, in the first embodiment, the positioning structure includes a positioning portion 151, and the positioning portion 151 extends from the inner side of the supporting frame 12 into the accommodation space 11. The vibration system 2 includes a voice coil assembly 21 and a vibrating diaphragm assembly 22, the voice coil assembly 21 is elastically connected to the positioning portion 151, and the vibrating diaphragm assembly 22 is elastically connected to the supporting frame 12 and further connected with the voice coil assembly 21. The voice coil assembly 21 and the vibrating diaphragm assembly 22 are all disposed on one side, close to the front cover 13, of the positioning portion 151, and the vibrating diaphragm assembly 22 seals one side, close to the front cover 13, of the supporting frame 12. Specifically, the positioning portion 151 is disposed on a respective side, close to the rear cover 14, of the main frame 122, the number of the positioning portion 151 is set as two and the two positioning portions 151 are are respectively disposed on two opposite sides of the main frame 122, and the two positioning portions 151 are staggered from the clamping plates 121, so that the positioning structure 15 provides stable support for the voice coil assembly 21 and the vibrating diaphragm assembly 22, and further avoids a connection between the clamping plates 121 and the magnetic circuit board system 3 from being interfered. The voice coil assembly 21 is elastically connected to the two positioning portions 151, which ensures that the voice coil assembly 21 may vibrate after being driven by the magnetic circuit system 3. The vibrating diaphragm assembly 22 is elastically connected to the supporting frame 12, and the vibrating diaphragm assembly 22 is connected to the voice coil assembly 21, so that the voice coil assembly 21 may drive the vibrating diaphragm assembly 22 to vibrate, thereby achieving sound production of the speaker module. In other embodiments, the positioning structure 15 may include four positioning portions 151, the four positioning portions 151 may be respectively disposed on four sides of the main frame 122, so that the positioning structure 15 may provide more stable support for the voice coil assembly 21 and the vibrating diaphragm assembly 22. The positioning structure 15 may be a ring-shaped positioning portion 151, compared with a plurality of the positioning portion 151 disposed at intervals, the ring-shaped positioning portion 151 which serves as the positioning structure 15 further provides more stable support for the voice coil assembly 21 and the vibrating diaphragm assembly 22.

As shown in FIGS. 4-7, in the first embodiment, the voice coil assembly 21 includes an elastic connecting member 212, a voice coil 211, and a flexible circuit board 213. One end of the elastic connecting member 212 is connected to a respective one of the positioning portions 151, the voice coil 211 is connected to one side, distal from the positioning portion 151, of the elastic connecting member 212, two ends of the flexible circuit board 213 are respectively and fixedly connected to the positioning portion 151 and the voice coil 211. One side, close to the front cover 13, of the voice coil 211 is connected to the vibrating diaphragm assembly 22. Specifically, the voice coil 211 is formed by winding voice coil leads, after the voice coil 211 is energized, the voice coil 211 is driven by the magnetic circuit system 3 to generate vibration to drive the vibration assembly 22 to vibrate, thereby achieving the sound production of the speaker module. The number of the elastic connecting member 212 is set as two, the two elastic connecting members 212 may be connecting members having elasticity, and the voice coil 211 is disposed between the two elastic connecting members 212, so that two opposite sides of the voice coil 211 are respectively and elastically connected to each of positioning portions 151, so that the voice coil 211 is achieved to vibrate in the accommodation space 11. Meanwhile, vibration of the voice coil 211 is ensured to be more balanced and is not easy to generate shaking and swaying, thereby improving sound production performance of the speaker module. The flexible circuit board 213 is set as one, the flexible circuit board 213 is disposed between the positioning portions 151 and the elastic connecting members 212, which is beneficial for the flexible circuit board 213 to tightly matched with the positioning portions 151. Furthermore, a board surface of one side, connected to the voice coil 211, of each of the positioning portions 151 has a large area at two ends and a small area in a middle portion, so that the board surface of each of the positioning portions 151 is matched with the flexible circuit board 213, which is beneficial for fixing the flexible circuit board 213. In other embodiments, the number of the elastic connecting members 212 and the number of the flexible circuit board 214 may be set as actually required, for example, the elastic connecting member 212 are set as four and the flexible circuit board 214 is set as two, etc.

As shown in FIGS. 4-7, in the embodiment, the vibrating diaphragm 22 includes a dome 221 and a vibrating diaphragm 222. The dome 221 is connected to the voice coil 21, the vibrating diaphragm 222 is fixed on the dome 221 and regards the dome 221 as a center to diverge outwards to connect to the supporting frame 21. The vibrating diaphragm 222 and the dome 221 together seal the one side, close to the front cover 13, of the supporting frame 12. Specifically, an area of the dome 221 is larger than an area of the voice coil 211, and one side, close to the voice coil 211, of the dome 221 is fixedly connected to the voice coil 211, which is beneficially for the voice coil 211 to drive the dome 221 to vibrate, and further to drive the vibrating diaphragm 222 to vibrate. The vibrating diaphragm 222 is disposed around the dome 221, and two ends of the vibrating diaphragm 222 are respectively connected to the dome 221 and the main frame 122, so that the vibrating diaphragm 222 seals one side, connected to a respective one end of the vibrating diaphragm 222, of the main frame 122, and the rear cover 14 seals one side, distal from the main frame 122, of the enclosing frame 123, thereby forming the rear cavity 5 being sealed. Furthermore, one end, connected to the dome 211, of the vibrating diaphragm 222 extends to a certain distance on an outer surface of the dome 221, thereby enhancing connection compactness between the vibrating diaphragm 222 and the dome 221.

Figure 4:
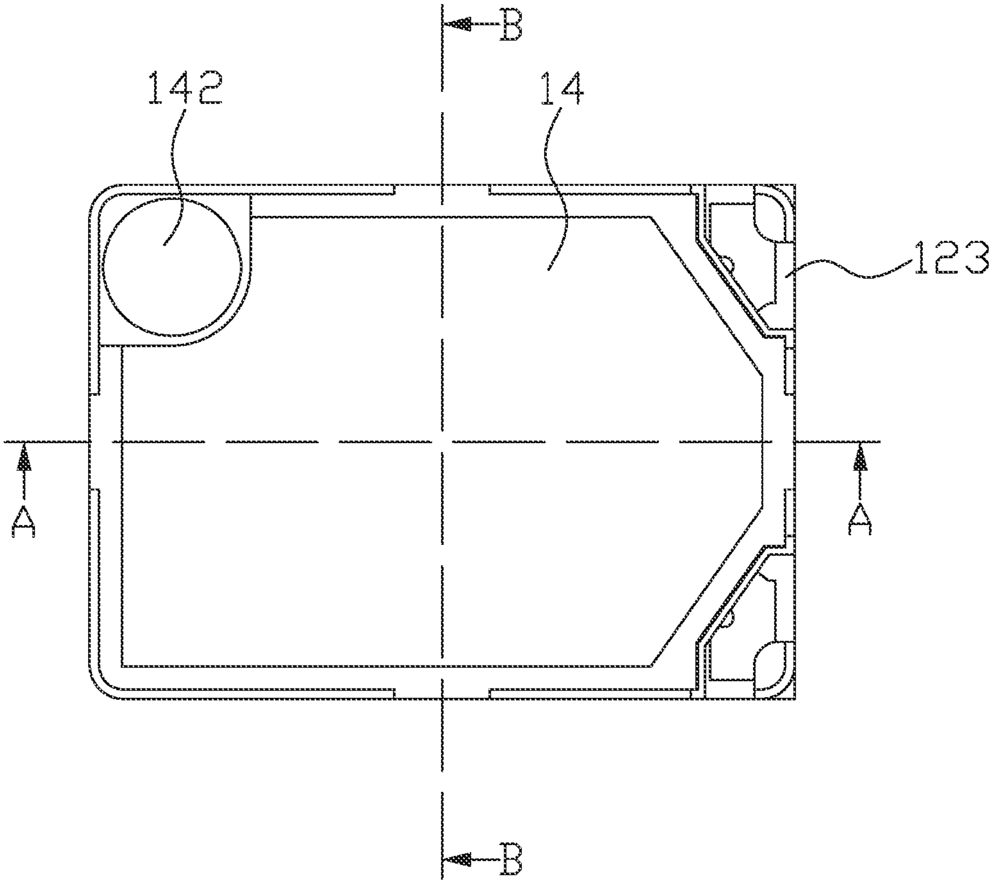
FIG. 4 is a schematic diagram of the speaker module viewing in a top plan view according to the first embodiment of the present disclosure.
Figure 5:
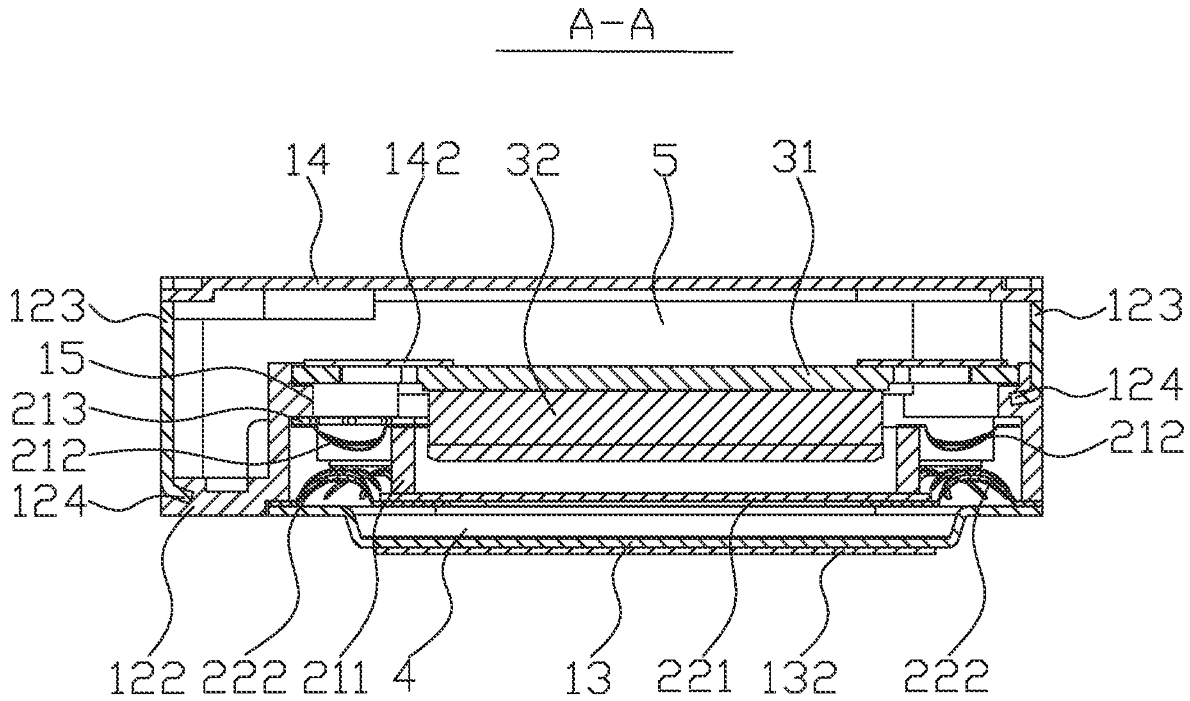
FIG. 5 is a cross-sectional schematic diagram taken along the line A-A shown in the speaker module of FIG. 4.
Figure 6:
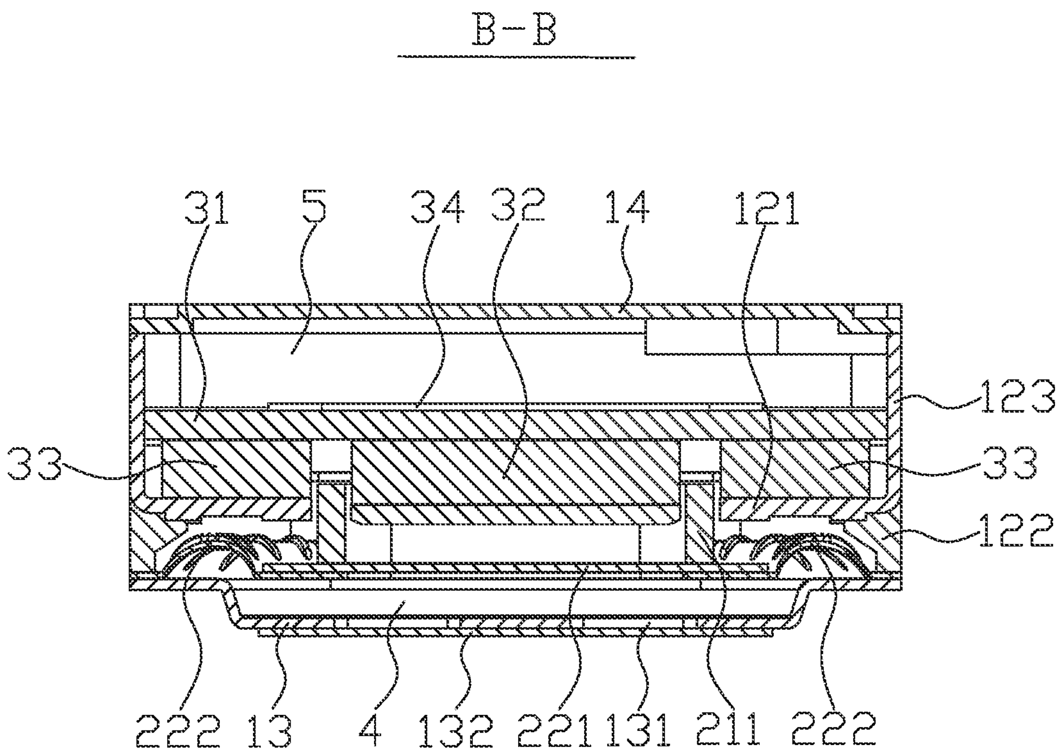
FIG. 6 is a cross-sectional schematic diagram taken along the line B-B shown in the speaker module of FIG. 4.
Figure 7:
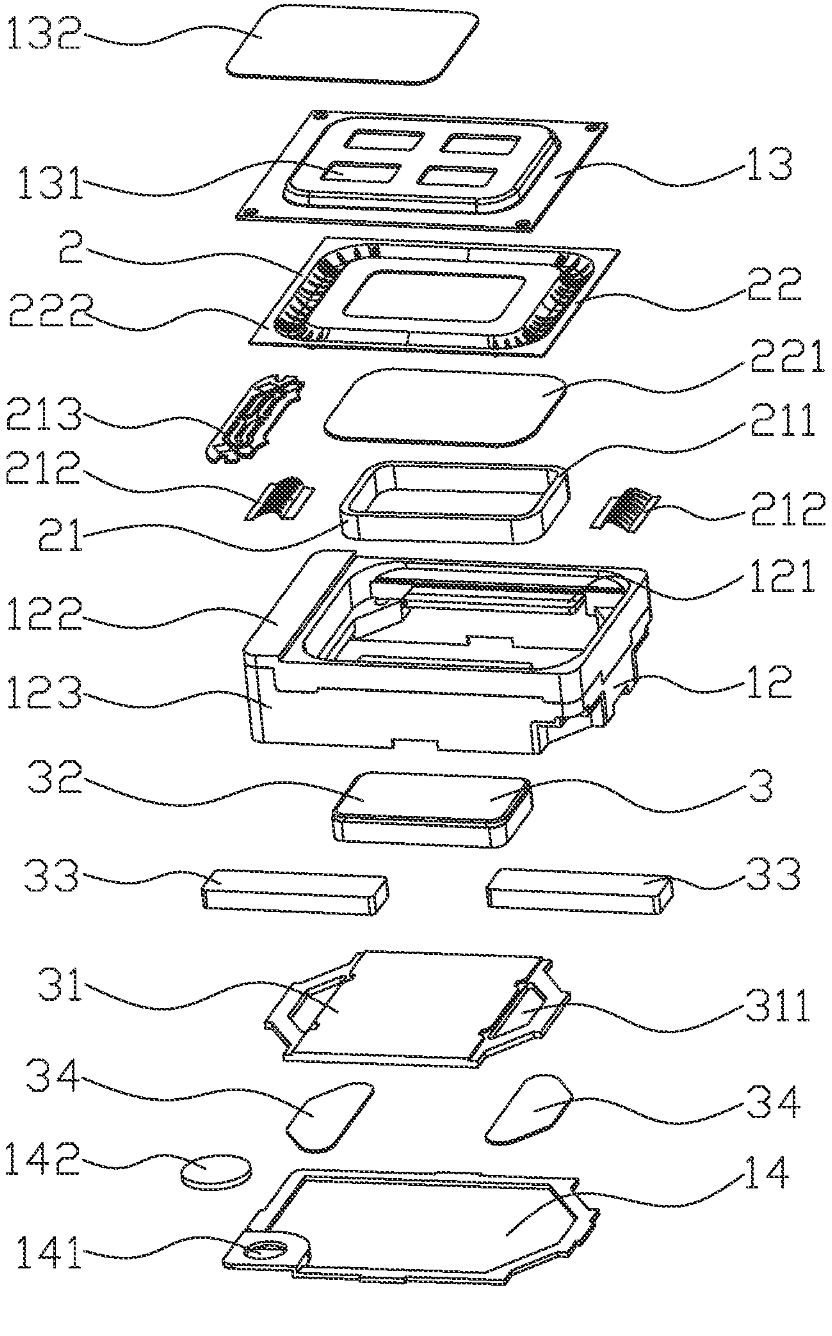
FIG. 7 is an exploded schematic diagram of the speaker module according to the first embodiment of the present disclosure.

As shown in FIGS. 4-6, the magnetic circuit system 3 includes a magnetic bowl 31, a first magnetic steel 32, and a second magnetic steel 33. The magnetic bowl 31 is fixed to one side, close to the rear cover 14, of each of the positioning portions 151, the first magnetic steel 32 is fixed to the magnetic bowl 31 and accommodated in the voice coil 211, the second magnetic steel 33 is fixed to the magnetic bowl 31 and are spaced apart from the first magnetic steel 32. One side, distal from the magnetic bowl 31, of the second magnetic steel 33 is respectively fixed to the clamping plates 121, and the voice coil 211 is disposed between the first magnetic steel 32 and the second magnetic steel 33. Specifically, a first end of the magnetic bowl 31 is fixedly connected to a first one of the two positioning portions 151, and a second end of the magnetic bowl 31 is fixedly connected to a second one of the two positioning portions 151, which achieves a fixed connection between the magnetic bowl 31 and the main frame 122. Moreover, the first end and the second end, connected to the positioning portions 151 of the magnetic bowl is matched with a shaped of each of the positioning portions 151, which is beneficial for fixedly connecting the magnetic bowl 31 with the main frame 122 through the positioning portions 151. The two clamping plates 121 extend from the first side, connected the main frame 122, of the enclosing frame 123 into the through cavity, where the two clamping plates 121 are disposed at intervals. The first magnetic steel 32 is a rectangular magnetic steel and disposed on a middle area of the magnetic bowl 31, the second magnetic steels 33 is strip-shaped magnetic steels and disposed on two sides of the first magnetic steel 32, and the first magnetic steel 32 is accommodated in the voice coil 211, so that the voice coil 211 is inserted into a magnetic gap between the first magnetic steel 32 and the second magnetic steel 22 to ensure that the first magnetic steel 32 and the second magnetic steel 33 may drive the voice coil 211 to vibrate after the voice coil 211 is energized. The second magnetic steel 33 is fixed with both the magnetic bowl 31 and the clamping plates 121, and the magnetic bowl 31 is fixed to the main frame 122, which is beneficial for improving overall stability of a magnetic steel system in the housing 1.

Furthermore, a concave groove is defined on one side, connected to the magnetic bowl 31, of each of the positioning portions 151 to form a step, which ensures that the positioning portions 151 are tightly matched with the magnetic bowl 31 and further improves connection compactness between the main frame 122 and the magnetic bowl 31. Meanwhile, when sound-absorbing materials are subsequently filled into the rear cavity 5, the sound-absorbing materials are prevented from permeating into a position where the magnetic bowl 31 and the main frame 122 are connected, and the vibration system 2 is prevented from being interfered by the sound-absorbing materials, which improves reliability of the vibration system 2.

As shown in FIGS. 4-6, in the first embodiment, a ventilation holes 311 is defined on the magnetic bowl 31. The magnetic circuit system 3 further includes a ventilation spacer 34, the ventilation spacer 34 is fixed on the magnetic bowl 31 and covers the ventilation hole 311. The magnetic bowl 31, the ventilation spacer 34, the supporting frame 12, and the rear cover 14 enclose to form a filing cavity. Specifically, the number of the ventilation hole 311 is set as two, and the two ventilation holes 311 are disposed on the magnetic bowl 31 at intervals, which is convenient for dissipating heat generated by the vibration system 2 and the magnetic steel system during working and further improves use stability of the loudspeaker module. The number of the ventilation spacer 34 is set as two, the ventilation spacer 34 is an element that is air-permeable and has an isolation function and may be specifically dustproof mesh clothes 132, and the dustproof mesh clothes 132 are formed by weaving polyester as raw materials by using a high-precision loom, and have characteristics of variable density, light weight, certain rigidity, etc. Specific woven materials may be selected from one or two of polyethylene terephthalate (PET) and polyetheretherketone (PEEK). A filing hole 141 is defined on the rear cover 14, and the filing hole 141 is communicated with the filing cavity, the filing hole 141 is sealed by a sealing member 142. When the sound-absorbing materials need to be filled into the filling cavity, the sealing member 142 is removed, and the sound-absorbing materials are filled into the filling cavity through the filling hole 141, so that the sound-absorbing materials can improve ta low-frequency effect of the loudspeaker module. In other embodiments, the number of the ventilation hole 311 and the number of the ventilation spacer 34 may be set as actually required, such as three or four.

As shown in FIGS. 4-6, in the first embodiment, an area, with respect to the voice coil assembly 21, of the front cover 13 protrudes towards a direction distal from the voice coil assembly 21. At least one sound hole 131 is defined on the area, with respect to the voice coil assembly 21, of the front cover 13, a mesh cloth 132 is fixed on one side, distal from the voice coil assembly 21, of the front cover 13, and the mesh cloth 132 covers the sound hole 131. Specifically, the front cover 13 is fixed to the main frame 122, and vibrating diaphragm 222 is clamped on the front cover 13. The at least one sound hole 131 is set as four, and the four sound holes 131 are defined on the area, with respect to the voice coil assembly 21, of the front cover 13. The mesh cloth 132 may be a sound transmission mesh cloth 132, the mesh cloth 132 covers all of the at least one sound hole 131, which effectively avoids an interior of the speaker module from entering sundries.

Second Embodiment

Figure 8:
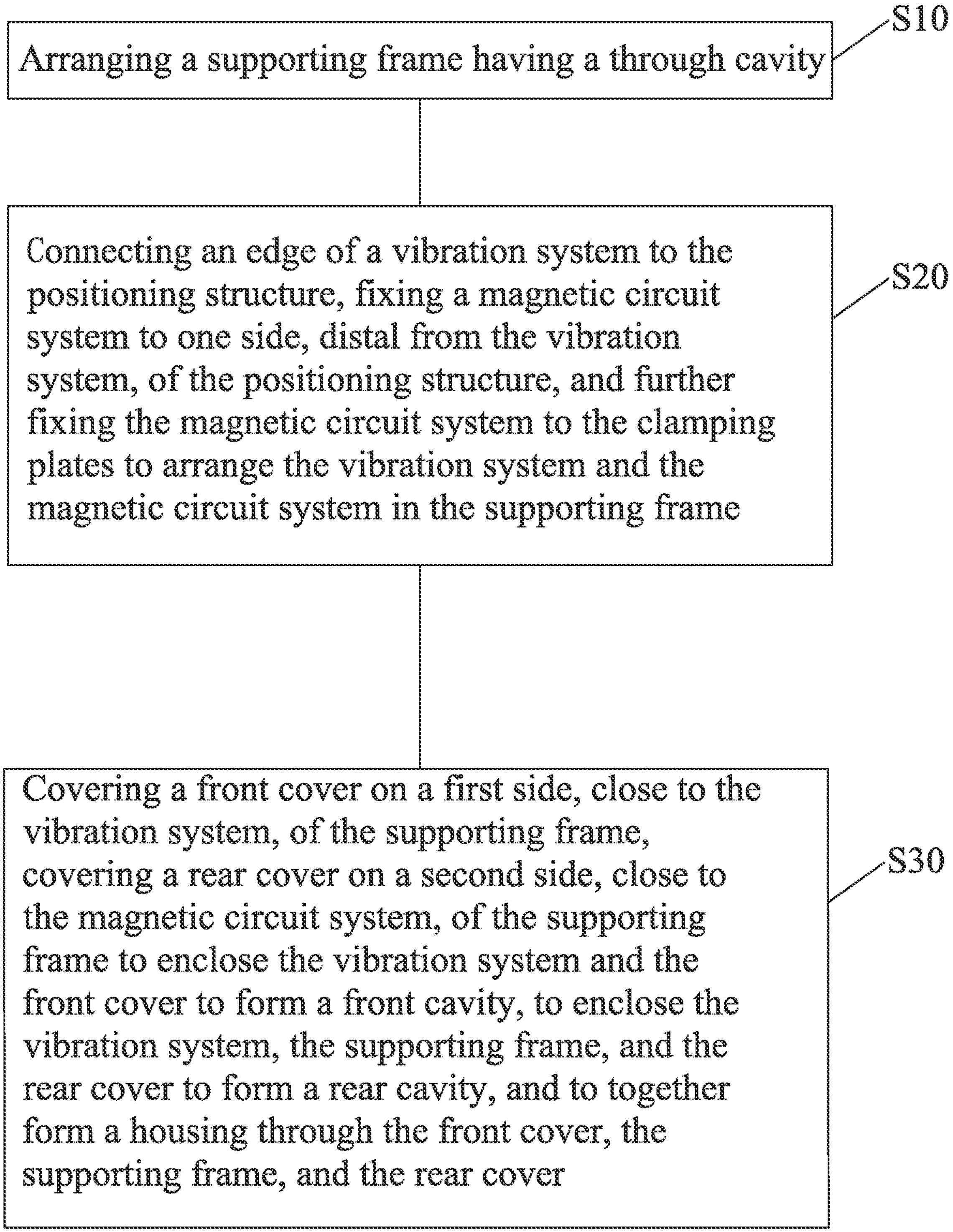
FIG. 8 is a flow chart of an assembling method of the speaker module according a second embodiment of the present disclosure.

As shown in FIG. 8, the present disclosure further provides an assembling method of the speaker module mentioned above, including following steps:

S10: arranging a supporting frame having a through cavity.

In the second embodiment, the supporting frame 12 includes a main frame 122 and an enclosing frame 123, the through cavity is defined on the main frame 122, and the enclosing frame 123 is fixedly connected to one side, distal from the front cover 13, of the main frame 122. A positioning structure 15 is disposed on an inner side of the supporting frame 12 and is further disposed on the main frame 122. Clamping plates 131 extend from one side, connected to the main frame 122, of the enclosing frame 123 into the through cavity. The main frame 122, the enclosing frame 123, and the clamping plates 121 are integrally disposed. The positioning structure 16 includes a positioning portion 151, where the positioning portion 151 extend from the inner side of the supporting frame 12 into an accommodation space 11.

S20: connecting an edge of a vibration system 2 to the positioning structure 15, fixing a magnetic circuit system 3 to one side, distal from the vibration system 2, of the positioning structure 5, and further fixing the magnetic circuit system 3 to the clamping plates 121 to arrange the vibration system 2 and the magnetic circuit system 3 in the supporting frame 12.

In the second embodiment, the vibration system 2 includes an elastic connecting member 212, a voice coil 211, and a flexible circuit board 213, a dome 221, and a vibrating diaphragm 222. The magnetic circuit system 3 includes a magnetic bowl 31, a ventilation spacer 24, a first magnetic steel 32, and a second magnetic steel 33.

In the S20, the edge of the vibration system 2 is connected to the positioning structure 15. Specifically, a pre-assembled part, including the vibrating diaphragm 222, the dome 221, and the voice coil 211, of the vibration system 2 is elastically connected to the positioning portion 151 through the elastic connecting member 212., and the flexible circuit board 213 is fixed to the positioning portion 151 and connected with the voice coil 211 to complete assembly of the vibration system 2. It should be noted that the pre-assembled part of the vibration system 2 may have a plurality of combinations, such as a combination including the vibrating diaphragm 222 and the dome 221, a combination including the voice coil 211 and the flexible circuit board 213, etc.

The magnetic circuit system 3 is fixed to one side, distal from the vibration system 2, of the positioning structure 15 and is connected with the clamping plates. Specifically, the magnetic circuit system 3 which is pre-assembled, including the magnetic bowl 21, the ventilation spacer 34, the first magnetic steel 32, and the second magnetic steel 33, is directly disposed on the positioning portion 151. Meanwhile, the first magnetic steel 32 extends into the voice coil and the second magnetic steel 33 is fixed with a respective one of the clamping plates 121. The magnetic circuit system 3 which is pre-assembled has a plurality of combinations, such as a combination of the magnetic bowl 31, the first magnetic steel 32, and the second magnetic steel 33, etc.

Moreover, in the second embodiment, the vibration system 2 is arranged in the supporting frame 12, and then the magnetic circuit system 3 is arranged in the supporting frame 12, which is convenient for subsequently extending the first magnetic steel 32 into the voice coil 211 when arranging the magnetic circuit system 3. In other embodiments, the magnetic circuit system 3 is first arranged, and then the vibration system 2 is arranged.

S30: covering a front cover 13 on a first side, close to the vibration system 2, of the supporting frame 12, covering a rear cover 14 on a second side, close to the magnetic circuit system 3, of the supporting frame 12 to enclose the vibration system 2 and the front cover 13 to form a front cavity 4, to enclose the vibration system 2, the supporting frame 12, and the rear cover 14 to form a rear cavity 5, and to together form a housing 1 through the front cover 13, the supporting frame 12, and the rear cover 14.

In the embodiment, the housing 1 includes the supporting frame 12, the front cover 13, and the rear cover 14. The through cavity is defined on the housing 1, the front cover 13 covers the first side of the supporting frame 12, and the rear cover 14 covers the second side, faces away from the front cover 13, of the supporting frame 12. An area, with respect to the voice coil assembly 21, of the front cover 13 protrudes towards a direction distal from the voice coil assembly 21. At least one sound hole 131 is defined on the area, with respect to the voice coil assembly 21, of the front cover 13. A mesh cloth 132 is fixed on one side, distal from the voice coil assembly 21, of the area, with respect to the voice coil assembly 21, of the front cover 13, and the mesh cloth 132 covers the at least one sound hole 131. A filing hole 141 is defined on the rear cover 14, and the filing hole 141 is communicated with the filing cavity, the filing hole 141 is sealed by a sealing member 142.

In the S30, the rear cover 14 is covered on the enclosing frame 123, then the front cover 13 is covered on the main frame 122, then the mesh cloth 132 is covered on the area, with respect to the voice coil assembly 21, of the front cover 13. After then, the sound-absorbing materials are filled in the filing cavity through the filing hole 141, after filing the sound-absorbing materials, the filing hole 141 is sealed by the sealing member 142 to obtain the speaker module.

In the second embodiment, the vibration system 2 and the magnetic circuit system 3 are assembled in the accommodation space 11 of the housing 1 through the positioning structure 15 to directly assemble the vibration system 2 and the magnetic circuit system 3 with the housing 1 to obtain the loudspeaker module. Compared with the related art, an assembling process of the speaker module of the present disclosure is simplified from two separate assembly processes of the speaker and the module into single assemble process of the speaker, which provides the simple assembling process and further reduces the cost. Meanwhile, the vibration system 2, the supporting frame 12, and the rear cover 14 enclose to form the rear cavity 5 having better leakproofness, which is beneficial for reducing the risk of air leakage.

The foregoing are merely embodiments of the present disclosure, and it should be noted that, for those who skilled in the art, improvements can be made without departing from the concepts of the present disclosure, but these are all within the protection scopes of the present disclosure.

What is claimed is:

1. A speaker module, comprising:

a housing;

a vibration system; and a magnetic circuit system;

wherein an accommodation space is defined in the housing, the vibration system is accommodated in the accommodation space, and the magnetic circuit system is accommodated in the accommodation space and is configured to drive the vibration system; the housing comprises a supporting frame, a front cover, and a rear cover; a through cavity is defined in the supporting frame, the front cover covers a first side of the supporting frame, and the rear cover covers a second side of the supporting frame, where the second side of the supporting frame faces away from the front cover; a positioning structure is disposed on an inner side of the supporting frame, the inner side of the supporting frame extends into the through cavity to form clamping plates, an edge of the vibration system is connected to a first side, close to the front cover, of the positioning structure, and the magnetic circuit system is fixed to a second side, close to the rear cover, of the positioning structure and further fixed to the clamping plates; the vibration system and the front cover enclose to form a front cavity; and the vibration system, the supporting frame, and the rear cover enclose to form a rear cavity.

2. The speaker module according to claim 1, wherein the supporting frame comprises a main frame and an enclosing frame, the through cavity is defined on the main frame, and the enclosing frame is fixedly connected to one side, distal from the front cover, of the main frame; the positioning structure is disposed on the main frame; a first side, connected to the main frame, of the enclosing frame extends into the through cavity to form the clamping plates; the main frame, the enclosing frame, and the clamping plates are integrally disposed, and the rear cover covers a second side, faces away from the main frame, of the enclosing frame.

3. The speaker module according to claim 2, wherein the main frame is made of a plastic material; the first side, connected the main frame, of the enclosing frame is bent towards one side to form a connecting edge; and the connecting edge is embedded and connected in the main frame.

4. The speaker module according to claim 1, wherein the positioning structure comprises a positioning portion, and the positioning portion extends from the inner side of the supporting frame into the accommodation space; the vibration system comprises a voice coil assembly and a vibrating diaphragm assembly, the voice coil assembly is elastically connected to the positioning portion, and the vibrating diaphragm assembly is elastically connected to the supporting frame and further connected with the voice coil assembly; the voice coil assembly and the vibrating diaphragm assembly are all disposed on one side, close to the front cover, of the positioning portion, and the vibrating diaphragm assembly seals one side, close to the front cover, of the supporting frame.

5. The speaker module according to claim 4, wherein the voice coil assembly comprises an elastic connecting member, a voice coil, and a flexible circuit board; one end of the elastic connecting member is connected to the positioning portion, the voice coil is connected to one side, distal from the positioning portion, of the elastic connecting member, two ends of the flexible circuit board are respectively and fixedly connected to the positioning portion and the voice coil; one side, close to the front cover, of the voice coil is connected to the vibrating diaphragm assembly.

6. The speaker module according to claim 5, wherein the vibrating diaphragm comprises a dome and a vibrating diaphragm; the dome is connected to the voice coil, the vibrating diaphragm is fixed on the dome and regards the dome as a center to diverge outwards to connect to the supporting frame; the vibrating diaphragm and the dome together seal the one side, close to the front cover, of the supporting frame.

7. The speaker module according to claim 5, wherein the magnetic circuit system comprises a magnetic bowl, a first magnetic steel, and a second magnetic steel; the magnetic bowl is fixed to one side, close to the rear cover, of the positioning portion, the first magnetic steel is fixed to the magnetic bowl and accommodated in the voice coil, the second magnetic steel is fixed to the magnetic bowl and are spaced apart from the first magnetic steel; one side, distal from the magnetic bowl, of the second magnetic steel is respectively fixed to the clamping plates; and the voice coil is disposed between the first magnetic steel and the second magnetic steel.

8. The speaker module according to claim 7, wherein a ventilation hole is defined on the magnetic bowl; the magnetic circuit system further comprises a ventilation spacer, the ventilation spacer is fixed on the magnetic bowl and covers the ventilation hole; the magnetic bowl, the ventilation spacer, the supporting frame, and the rear cover enclose to form a filing cavity.

9. The speaker module according to claim 8, wherein a filing hole is defined on the rear cover, and the filing hole is communicated with the filing cavity; an area, with respect to the voice coil assembly, of the front cover protrudes towards a direction distal from the voice coil assembly; at least one sound hole is defined on the area, with respect to the voice coil assembly, of the front cover, a mesh cloth is fixed on one side, distal from the voice coil assembly, of the front cover, and the mesh cloth covers the at least one sound hole.

10. An assembling method of the speaker module, comprising following steps:

arranging a supporting frame having a through cavity, where a positioning structure is disposed on an inner side of the supporting frame and the inner side of the supporting frame extends into the through cavity to form clamping plates;

connecting an edge of a vibration system to the positioning structure, fixing a magnetic circuit system to one side, distal from the vibration system, of the positioning structure, and further fixing the magnetic circuit system to the clamping plates to arrange the vibration system and the magnetic circuit system in the supporting frame; and covering a front cover on a first side, close to the vibration system, of the supporting frame, covering a rear cover on a second side, close to the magnetic circuit system, of the supporting frame to enclose the vibration system and the front cover to form a front cavity, to enclose the vibration system, the supporting frame, and the rear cover to form a rear cavity, and to together form a housing through the front cover, the supporting frame, and the rear cover.

* * * * *